United States Patent [19]

Morris

[11] 4,279,450
[45] Jul. 21, 1981

[54] ROTARY ROCK BIT FLUID CENTER SEAL

[75] Inventor: Jerald D. Morris, Desoto, Tex.

[73] Assignee: Dresser Industries, Inc., Dallas, Tex.

[21] Appl. No.: 81,739

[22] Filed: Oct. 4, 1979

[51] Int. Cl.$^3$ .......................... F16C 33/72; E21B 9/08
[52] U.S. Cl. .................................... 308/8.2; 175/372; 277/226; 308/187.1
[58] Field of Search ...................... 308/8.2, 36.1, 36.3, 308/187.1; 175/371, 372; 277/95, 96.3, 201, 226

[56] References Cited

U.S. PATENT DOCUMENTS

| | | | |
|---|---|---|---|
| 2,285,870 | 6/1942 | Parker | 308/36.1 |
| 2,688,436 | 9/1954 | Melaven | 277/226 |
| 3,336,998 | 8/1967 | Avrea | 308/187.1 |
| 3,397,928 | 8/1968 | Galle | 308/8.2 |
| 3,419,093 | 12/1968 | Lichte et al. | 175/372 |
| 3,765,495 | 10/1973 | Murdoch et al. | 308/8.2 |
| 3,944,306 | 3/1976 | Neilson | 308/187.1 |
| 4,037,673 | 7/1977 | Justmann | 175/371 |
| 4,176,724 | 12/1979 | Vezirian | 175/371 |

FOREIGN PATENT DOCUMENTS 560054  6/1977  U.S.S.R. .................................. 175/372

Primary Examiner—Richard R. Stearns
Attorney, Agent, or Firm—Eddie E. Scott; Fred A. Winans

[57] ABSTRACT

An improved sealing system for a rotary rock bit retains lubricant inside the bearing area of the bit and acts as a barrier to the pulverized cuttings and other materials in the borehole to prevent the materials from entering the bearing area through the cone mouth opening of the rolling cone cutter. An annular seal member located in the cone mouth opening has a hollow core filled with a fluid. The fluid will flow thru the hollow core when pressure is applied. During drilling with a rotary rock bit the lower or loaded side of the bearing has less clearance than the upper or unloaded side. The pressure on the loaded side of the bearing will force the fluid to the unloaded side of the seal member and cause that side of the seal member to expand and fill the clearance to maintain a seal.

1 Claim, 4 Drawing Figures

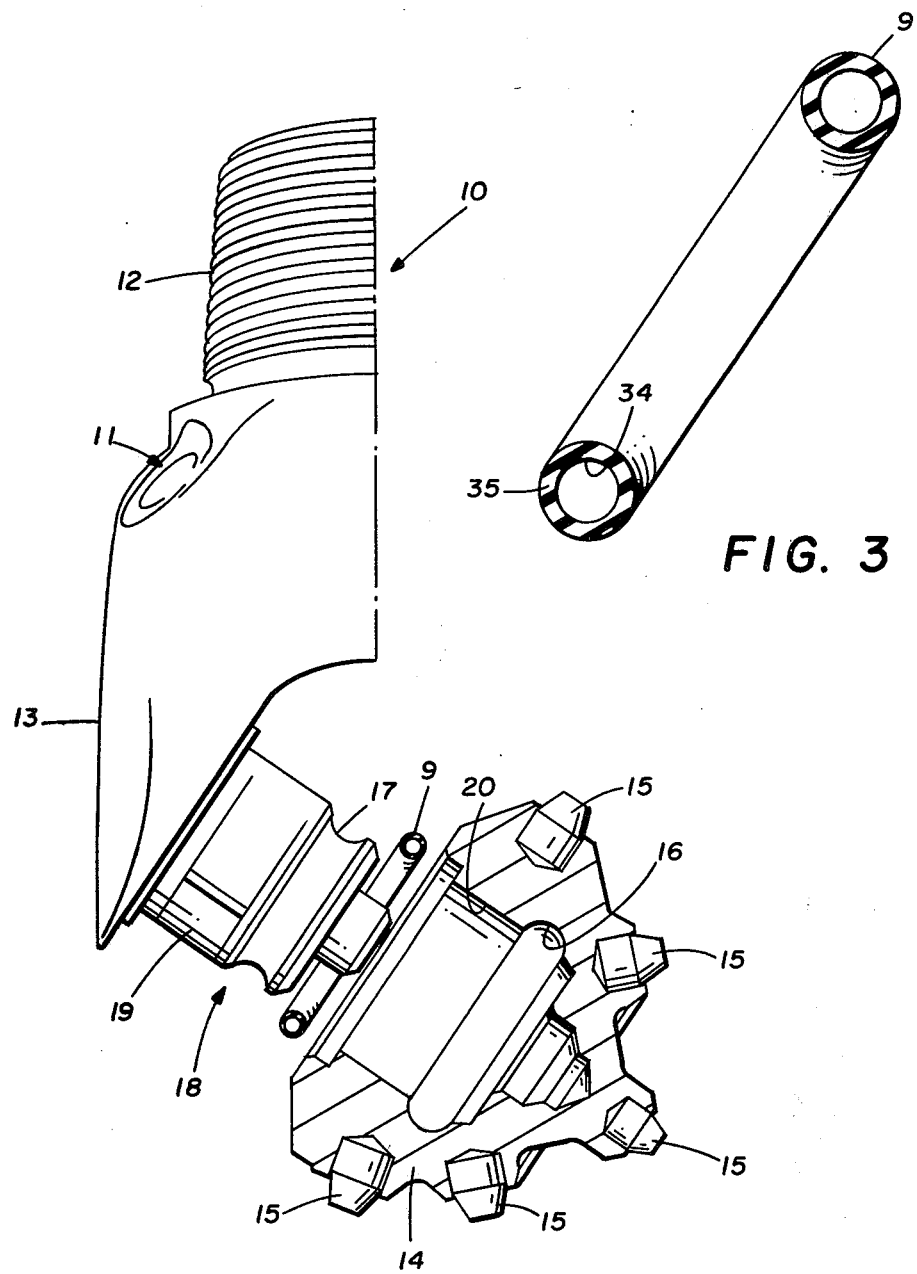

ROTARY ROCK BIT FLUID CENTER SEAL

BACKGROUND OF THE INVENTION

The present invention relates to the art of rolling cone cutter earth boring bits and, more particularly, to a rolling cone cutter earth boring bit with improved means for sealing the bearings of the bit from the abrasive materials in the borehole and retaining lubricant within the bearing area.

A rolling cone cutter earth boring bit consists of a main bit body adapted to be connected to a rotary drill string. The bit includes individual rotatable cone cutters mounted on individual bearing pins extending from the main bit body. Bearing systems are provided between the cone cutters and the bearing pins to promote rotation of the cutters and means are provided on the outer surface of the cone cutters for disintegrating the earth formations as the bit and the cutters rotate. A sufficient supply of uncontaminated lubricant should be maintained proximate the bearing systems throughout the lifetime of the bit. Various forms of seals have been provided between the cone cutters and the bearing pins upon which they are mounted to retain lubricant and prevent contamination; however, the need for new sealing systems is as acute today as any time in the history of rock drilling.

A rolling cone cutter earth boring bit must operate under very severe conditions and the size and geometry of the bit is restricted by the operating characteristics. At the same time, a longer lifetime and improved performance is needed from the bit. In attempting to provide an improved bit, new and improved materials have been developed for the cutting structure of the cone cutters. They have provided a longer useful lifetime for the cone cutters. This has resulted in the sealing and bearing systems of the bit being often the first to fail during the drilling operation. Consequently, a need exists for new and improved sealing and bearing systems to extend the useful lifetime of the bit and to allow development of other elements that interact with the sealing and bearing systems.

During drilling with a rotary rock bit the lower or loaded side of the bearing has less clearance than the upper or unloaded side. The weight on the bit causes substantially all of the clearance to move to the top or unloaded side of the bearing. This condition is aggravated by wear on the load side of the bearing and on the rolling cone cutter, by wobble and bounce of the rolling cone cutter during drilling and by eccentricity of the bearing and rolling cone cutter from the manufacturing process.

DESCRIPTION OF PRIOR ART

In U.S. Pat. No. 3,397,928 to E. M. Galle, patented Aug. 20, 1968, a seal means for drill bit bearings is shown. The seal means includes a shaft rigidly secured to a drill bit body with a bearing surface formed thereon. A cutter element is rotatably mounted to said shaft and includes a bearing surface thereon that opposes and engages the bearing surface on the shaft. A resilient packing ring is positioned in a groove in one of the surfaces. The packing ring, the groove and an opposing surface are sized such that upon assembly of the cutter element upon the shaft the cross sectional thickness of the packing ring is compressed by not less than substantially 10% of this thickness prior to assembly of the cutter element upon the shaft.

Other drill bit bearing systems are shown in U.S. Pat. No. 1,884,965 to Baggett, U.S. Pat. No. 2,797,067 to Fisher, U.S. Pat. No. 3,075,781 to Atkinson, U.S. Pat. No 3,096,835 to Neilson, U.S. Pat. No. 3,151,691 to Goodwin, U.S. Pat. No. 3,303,898 to Bercaru, U.S. Pat. No. 3,529,840 to Durham and U.S. Pat. No. 3,862,762 to Millsapps.

SUMMARY OF THE INVENTION

The present invention provides a sealing system for a rolling cone cutter earth boring bit that retains lubricant inside the bit and acts as a barrier to the pulverized cuttings and other materials in the borehole to prevent the materials from entering the bearing area through the cone mouth opening of the rolling cone cutter. The sealing system utilizing a sealing member with the capability of sealing in situations where unequal loads are encountered, for example when the loaded side of the bearing has less clearance than the unloaded side, or when the bearings have laterally and axially run out, eccentricity, and uneven loading due to wear. The sealing member has a hollow core filled with a substance which will flow thru the hollow core when pressure is applied. In the case of uneven loading on a bearing, the loaded (or squeezed) side will force the substance to the area of least resistance (unloaded side) and allow that side of the seal member to expand and fill the space and continue sealing. The above and other features and advantages of the present invention will become apparent upon consideration of the following detailed description of the invention when taken in conjunction with the accompanying drawings.

BRIEF DESCRIPTION OF THE DRAWINGS

FIG. 1 illustrates one arm of a rotary rock bit constructed in accordance with the present invention.

FIG. 2 is a sectional view of the arm of the bit shown in FIG. 1.

DETAILED DESCRIPTION OF THE INVENTION

Figure 5:
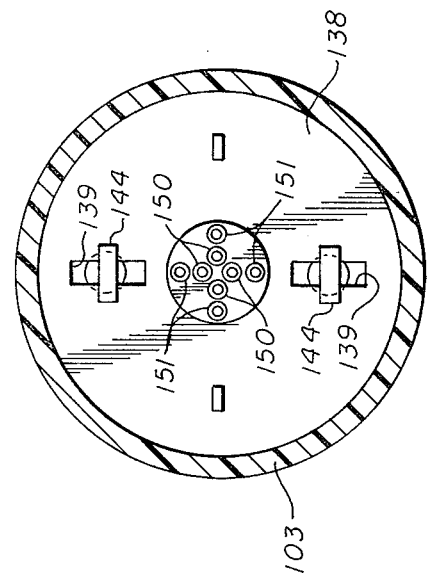

Referring now to the drawings and to FIG. 1 in particular, illustrated therein and generally designated by the reference number 10 is a three cone cutter sealed bearing rotary rock bit. The bit 10 includes a bit body 11, including an upper threaded portion 12. The threaded portion 12 allows the bit 10 to be connected to the lower end of a rotary drill string (not shown). Depending from the bit body 11 are three substantially identical arms with only the arm 13 being shown in FIG. 1. The lower end of each of the arms is provided with an extended bearing pin comprising a journal portion and the details of this journal portion will be discussed subsequently. Three rotary cone cutters are adapted to be rotatably positioned on the three bearing pins extending from the arms. The cutter 14 is shown in FIG. 1. Each of the cutters includes cutting structure on its outer surface adapted to disintegrate formations as the bit 10 is rotated and moved downward. The cutting structure is shown in the form of tungsten carbide inserts 15. However, it is to be understood that other cutting structures such as steel teeth may be used as the cutting structure on the cone cutters.

The bit 10 includes a central passageway extending along the central axis of body 11 to allow drilling fluid to enter from the upper section of the drill string (not shown) immediately above and pass downward through jet nozzles past the cone cutters. In use, the bit 10 is connected as the lower member of a rotary drill string (not shown) and lowered into the well bore until the cone cutters engage the bottom of the well bore. The drill string is rotated rotating the bit 10 therewith and drilling fluid is forced down through the interior passage of the rotary drill string by mud pumps located at the surface. The drilling fluid continues through the central passageway of the bit 10, passing through the nozzles past the cutting structure of the cutters to the bottom of the well bore, thence upward in the annulus between the rotary drill string and the wall of the well bore, carrying with it the cuttings and debris from the drilling operation.

The bearing system of the bit must insure free rotation of the cone cutters under the severe drilling environmental conditions. The elongated lower portion of arm 13 forms the bearing pin 18 comprising a journal portion. The rotatable cutter 14 is mounted upon the journal portion. The bearing system of the present invention insures free rotation of rotatable cutter 14 under the severe drilling conditions. A series of ball bearings (not shown) that bridge between raceways 16 and 17 insure that rotatable cutter 14 is rotatably locked on bearing pin 18. The rotatable cutter 14 is positioned upon journal 18 and the series of ball bearings are inserted through a bore extending into arm 13. After the ball bearings are in place, a plug is inserted in the bore and welded therein. The seal member 9 forms a seal between cutter 14 and bearing pin 18 to prevent loss of lubricant or contamination of the lubricant from materials in the well bore. The details of this seal member 9 will be discussed subsequently.

Referring now to FIG. 2, a sectional view of the arm 12 of the rolling cone cutter earth boring bit 10 illustrating the present invention is shown. The cutter 14 is mounted upon the bearing pin 18. The bit 10 is a lubricated sealed bearing bit. The lubrication system of the bit 10 includes a passage 24 that extends through the arm 12 to bearing pin 14 to allow lubricant to be transmitted to the bearing systems. A passage 21 connected to passage 24 allows the make-up of the ball bearing system 31 by allowing the balls to be inserted into position after the cone cutter 14 is placed on the bearing pin 18. The series of ball bearings 31 serves to lock the cone cutter 14 on the bearing pin 18. After the balls are in place, a plug 22 is inserted into the bore 21 and welded therein by a weld 23. Plug 22 has a reduced diameter throughout the major portion of its length to allow lubricant to be transmitted to the bearing area. Additional passages may extend from bore 21 to the bearing area to insure a sufficient supply of lubricant to bearings 31, 32, 33 and 20.

A lubricant reservoir is located in the bit 10 to provide a supply of lubricant to the bearings. A flexible diaphragm 26 is positioned in the lubricant reservoir and encloses the reservoir to retain a supply of lubricant. The area within the reservoir chamber but outside of the diaphragm 26 is vented to the dome of the bit 10 by a passageway 30 that connects the lower end of the reservoir chamber with the dome of the bit. The upper end of the lubricant reservoir is closed by a cap 27 locked in place by a snap ring 29. An O-ring seal 28 is positioned around the cap 27 to retain lubricant in the lubricant reservoir. Lubricant within the reservoir is transmitted to the bearing area through passages 21 and 24 and retained within the bearing area by seal member 9.

Figure 3:
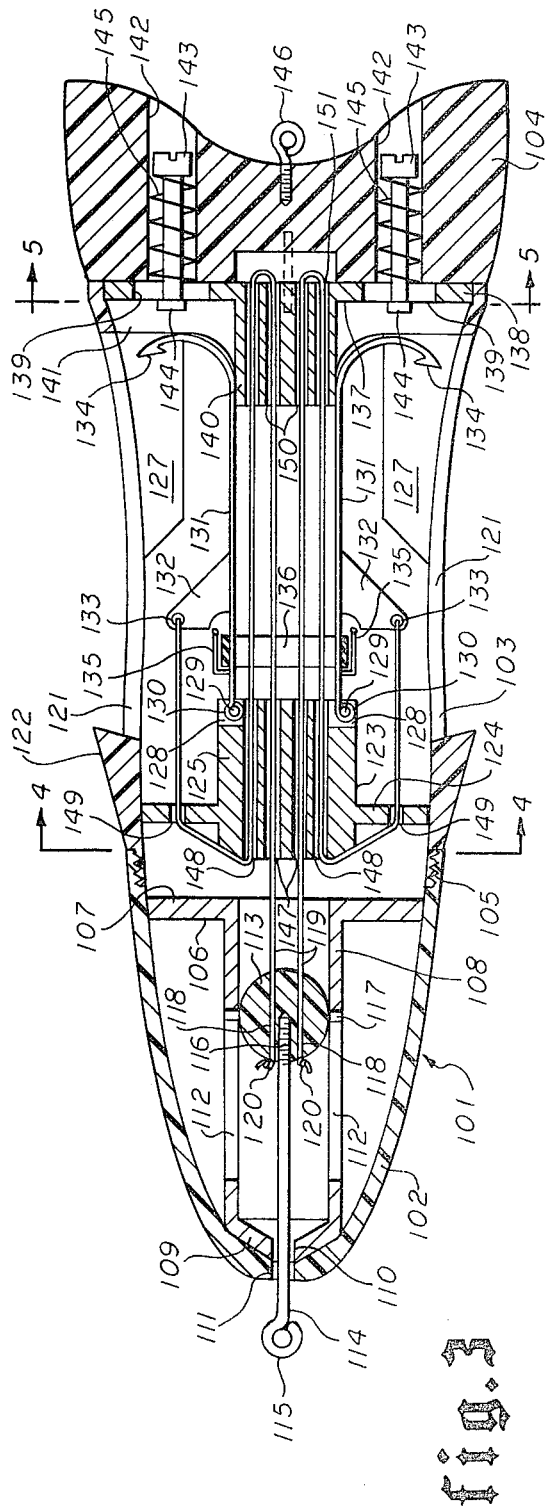
FIG. 3 is an illustration of the seal member of the bit shown in FIGS. 1 and 2.

Referring now to FIG. 3, an enlarged view of the seal member 9 is shown. The seal member 9 has a hollow core 34. The hollow core 34 is filled with a non-compressible fluid substance which will flow thru the hollow core 34 when pressure is applied to one side of the seal. In the case of uneven loading on the bearing, the loaded (or squeezed) side will force the non-compressible fluid substance to the area of least resistance (unloaded side) and allow that side of the seal member to expand, fill the space and continue sealing. The seal member 9 is positioned between the bearing pin and the rolling cone cutter. The seal assembly 9 retains the lubricant within the bit 10 and prevents the ingress of materials in the borehole into the bearing area.

Figure 4:
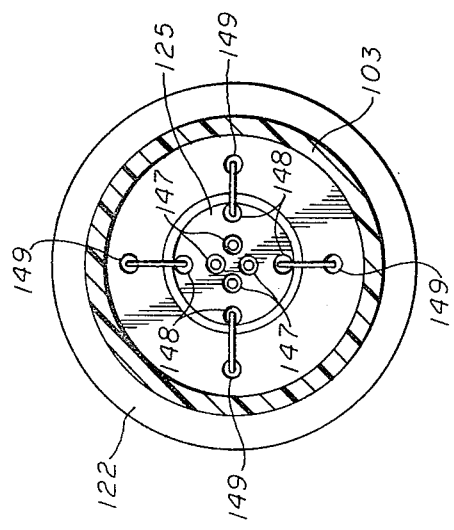
FIG. 4 is a sectional end view of the bearing pin, seal member and rolling cone cutter of the bit shown in FIGS. 1 and 2.

Referring now to FIG. 4, a sectional end view of the bearing pin 18 is shown. During drilling with a rotary rock bit the lower or loaded side of the bearing has less clearance than the upper or unloaded side. The upper gap between the rolling cone cutter 14 and the bearing pin 18 of the bit is larger than the lower gap. The seal member 9 continues to function when this situation is encountered. The seal member located in the cone mouth opening has a hollow core filled with a material that will flow thru the hollow core when pressure is applied. The pressure on the loaded side of the bearing will force the material to the unloaded side of the seal member and cause that side of the seal member to expand and fill the clearance to maintain a seal.

The embodiments of an invention in which an exclusive property or privilege is claimed are defined as follows:

1. A rotary rock bit for forming a borehole wherein materials are encountered in the borehole, comprising:
   a rock bit body;
   a rock bit arm depending from said body;
   a bearing pin projecting from said arm;
   a rolling cone cutter mounted concentrically on said bearing pin, said rolling cone cutter having a cavity projecting from a cone mouth, said cavity and cone mouth positioned over said bearing pin;
   bearing means in said cavity between said bearing pin and said rolling cone cutter;
   said cone mouth defining an annular groove open toward said pin;
   an annular flexible seal member positioned in said groove providing sealing engagement between the walls of said groove and said pin for preventing entry of materials from the borehole into said concave cavity;
   said seal member having a sealed annular hollow core completely filled with a non-compressible fluid; whereby during drilling said concentric relationship between said pin and said core is altered thereby radially compressing the flexible seal member in one area and forcing the enclosed fluid to an opposite area to expand the seal to fill the expanded radial space between the pin and cone a like amount to maintain an annular sealing engagement between the pin and core cavity.

* * * * *